United States Patent
Hanssen

(10) Patent No.: US 9,684,367 B2
(45) Date of Patent: Jun. 20, 2017

(54) POWER TRACE PORT FOR TRACING STATES OF POWER DOMAINS

(71) Applicant: Atmel Corporation, San Jose, CA (US)

(72) Inventor: Ingar Hanssen, Trondheim (NO)

(73) Assignee: Atmel Corporation, San Jose, CA (US)

( * ) Notice: Subject to any disclaimer, the term of this patent is extended or adjusted under 35 U.S.C. 154(b) by 109 days.

(21) Appl. No.: 14/316,625

(22) Filed: Jun. 26, 2014

(65) Prior Publication Data

US 2015/0378423 A1    Dec. 31, 2015

(51) Int. Cl.
  G06F 1/32    (2006.01)
  G06F 17/50   (2006.01)

(52) U.S. Cl.
  CPC .......... G06F 1/3296 (2013.01); G06F 1/3243 (2013.01); G06F 1/3287 (2013.01); G06F 17/505 (2013.01); Y02P 90/02 (2015.11)

(58) Field of Classification Search
  CPC ..... G06F 1/00; G06F 1/04; G06F 1/12; G06F 1/26; G06F 1/32; G06F 11/30; G06F 15/16
  See application file for complete search history.

(56) References Cited

U.S. PATENT DOCUMENTS

| | | |
|---|---|---|
| 4,475,134 A | 10/1984 | Bowden et al. |
| 4,677,566 A | 6/1987 | Whittaker et al. |
| 4,703,486 A | 10/1987 | Bemis |
| 5,579,498 A | 11/1996 | Ooi |
| 5,623,234 A | 4/1997 | Shaik et al. |
| 6,163,851 A | 12/2000 | Yamazoe et al. |
| 6,175,891 B1 | 1/2001 | Norman et al. |
| 6,255,878 B1 | 7/2001 | Gauvin et al. |
| 6,320,717 B1 | 11/2001 | Feng |
| 6,393,080 B1 | 5/2002 | Kamoshida et al. |
| 6,462,830 B1 | 10/2002 | Negishi |
| RE38,108 E | 5/2003 | Chee |
| 6,754,836 B2 | 6/2004 | Shimizu et al. |
| 6,839,013 B1 | 1/2005 | Cummins |
| 6,848,055 B1 | 1/2005 | Yarch |
| 7,203,855 B2 | 4/2007 | Chou |

(Continued)

OTHER PUBLICATIONS

US Non-Final Office Action in U.S. Appl. No. 14/043,445, dated Aug. 25, 2015, 12 pages.

(Continued)

*Primary Examiner* — Thomas Lee
*Assistant Examiner* — Mohammad A Rahman
(74) *Attorney, Agent, or Firm* — Fish & Richardson P.C.

(57) ABSTRACT

A power trace port included in a system (e.g., a microcontroller system) having multiple power domains includes a power trace port that outputs digital signals indicating the states of the power domains. If each power domain is independent of other power domains in the system, each power domain can have its own set of power trace pins in the power trace port that are at least partially external to the system. If a power domain has multiple states, multiple pins can be used to indicate the multiple states. In some implementations, the power trace port can include performance level pins for providing performance level signals. The power trace port can be coupled to power trace probes of a power analyzer that is external to the system for generating power traces.

23 Claims, 4 Drawing Sheets

(56) References Cited

U.S. PATENT DOCUMENTS

| | | | |
|---|---|---|---|
| 7,391,250 B1 | 6/2008 | Chuang | |
| 7,444,530 B2 | 10/2008 | Deppe | |
| 7,514,958 B1* | 4/2009 | Zhou | H03K 19/0016 326/136 |
| 7,574,683 B2 | 8/2009 | Wilson | |
| 7,770,142 B1* | 8/2010 | Shmayovitsh | G06F 17/5036 716/109 |
| 7,895,458 B2 | 2/2011 | Kim | |
| 7,954,078 B1* | 5/2011 | Wang | G06F 17/505 716/106 |
| 7,984,317 B2* | 7/2011 | Conroy | G06F 1/3203 713/324 |
| 8,001,433 B1* | 8/2011 | Bhatia | G01R 31/31856 714/727 |
| 8,190,931 B2 | 5/2012 | Laurenti et al. | |
| 8,255,722 B2 | 8/2012 | Pedersen et al. | |
| 8,352,235 B1* | 1/2013 | Lin | G06F 17/5036 703/14 |
| 8,683,419 B1* | 3/2014 | Hines | G06F 17/505 716/109 |
| 8,791,743 B1* | 7/2014 | Tang | H03K 3/356104 326/80 |
| 2003/0006807 A1 | 1/2003 | Masuda et al. | |
| 2003/0177404 A1 | 9/2003 | Jorgenson et al. | |
| 2003/0183024 A1 | 10/2003 | Lohberg et al. | |
| 2003/0198108 A1 | 10/2003 | Hausmann et al. | |
| 2004/0148545 A1 | 7/2004 | Higaki | |
| 2004/0158773 A1 | 8/2004 | Kang | |
| 2005/0083081 A1 | 4/2005 | Jacobson et al. | |
| 2007/0016810 A1 | 1/2007 | Ono | |
| 2007/0035433 A1 | 2/2007 | Baker | |
| 2007/0260794 A1 | 11/2007 | Ashish et al. | |
| 2008/0072094 A1 | 3/2008 | Hayano et al. | |
| 2008/0189455 A1 | 8/2008 | Dreps et al. | |
| 2008/0211559 A1 | 9/2008 | Tanaka | |
| 2009/0089607 A1 | 4/2009 | Rodriguez | |
| 2009/0089725 A1* | 4/2009 | Khan | G01R 31/31721 716/106 |
| 2009/0135751 A1 | 5/2009 | Hodges | |
| 2009/0140876 A1 | 6/2009 | Shi | |
| 2009/0144571 A1 | 6/2009 | Tatsumi | |
| 2009/0153210 A1 | 6/2009 | Wang et al. | |
| 2009/0164814 A1 | 6/2009 | Axford | |
| 2009/0201082 A1 | 8/2009 | Smith et al. | |
| 2009/0204835 A1 | 8/2009 | Smith et al. | |
| 2009/0256607 A1 | 10/2009 | Smith et al. | |
| 2009/0259863 A1 | 10/2009 | Williams et al. | |
| 2009/0259982 A1 | 10/2009 | Verbeure | |
| 2010/0064160 A1 | 3/2010 | Wilson | |
| 2010/0156458 A1 | 6/2010 | Speers | |
| 2010/0192115 A1* | 7/2010 | Yang | G06F 17/5022 716/104 |
| 2010/0229011 A1 | 9/2010 | Pedersen | |
| 2010/0281309 A1 | 11/2010 | Laurenti et al. | |
| 2010/0306570 A1 | 12/2010 | Uchida et al. | |
| 2011/0022826 A1 | 1/2011 | More | |
| 2011/0060931 A1 | 3/2011 | Radhakrishnan | |
| 2011/0131427 A1 | 6/2011 | Jorgenson et al. | |
| 2011/0138200 A1 | 6/2011 | Tomizawa | |
| 2011/0208888 A1 | 8/2011 | Park | |
| 2011/0221483 A1 | 9/2011 | Liu et al. | |
| 2011/0252251 A1 | 10/2011 | De Cesare et al. | |
| 2011/0264902 A1 | 10/2011 | Hollingworth | |
| 2011/0276812 A1 | 11/2011 | Lee | |
| 2012/0017099 A1 | 1/2012 | David | |
| 2012/0047402 A1 | 2/2012 | Chen et al. | |
| 2012/0120958 A1 | 5/2012 | Mahadevan et al. | |
| 2012/0161942 A1 | 6/2012 | Muellner | |
| 2012/0268995 A1 | 10/2012 | Sugimoto et al. | |
| 2013/0063114 A1 | 3/2013 | Agrawal et al. | |
| 2013/0067250 A1 | 3/2013 | Wu et al. | |
| 2013/0073878 A1 | 3/2013 | Jayasimha et al. | |
| 2013/0097445 A1 | 4/2013 | Palaniappan et al. | |
| 2013/0111236 A1 | 5/2013 | Ananthakrishnan | |
| 2013/0124895 A1 | 5/2013 | Saha et al. | |
| 2013/0159776 A1 | 6/2013 | Gilday | |
| 2013/0170413 A1 | 7/2013 | Chow | |
| 2013/0339589 A1 | 12/2013 | Qawami et al. | |
| 2014/0089706 A1 | 3/2014 | Menard et al. | |
| 2014/0089707 A1 | 3/2014 | Jouin et al. | |
| 2014/0089708 A1 | 3/2014 | Menard et al. | |
| 2014/0089714 A1 | 3/2014 | Pedersen et al. | |
| 2014/0092507 A1 | 4/2014 | Lefferts | |
| 2014/0122833 A1* | 5/2014 | Davis | G06F 15/7803 712/29 |
| 2014/0281648 A1 | 9/2014 | Russell et al. | |
| 2014/0301152 A1 | 10/2014 | Cox et al. | |
| 2014/0359044 A1* | 12/2014 | Davis | H04L 45/60 709/213 |
| 2015/0082092 A1* | 3/2015 | Sarangi | G06F 11/27 714/30 |
| 2015/0082093 A1* | 3/2015 | Sarangi | G06F 11/27 714/30 |
| 2015/0095681 A1 | 4/2015 | Jouin et al. | |
| 2015/0220678 A1* | 8/2015 | Srivastava | G06F 17/5081 716/109 |
| 2016/0274655 A1 | 9/2016 | Jouin et al. | |

OTHER PUBLICATIONS

US Final Office Action in U.S. Appl. No. 13/789,902, dated Sep. 2, 2015, 18 pages.

US Notice of Allowance in U.S. Appl. No. 13/785,999, dated Sep. 10, 2015, 16 pages.

US Final Office Action in U.S. Appl. No. 13/786,042, dated Sep. 10, 2015, 13 pages.

US Notice of Allowance in U.S. Appl. No. 13/788,366, dated Oct. 13, 2015, 20 pages.

US Non-Final Office Action in U.S. Appl. No. 13/788,366, dated Apr. 9, 2015, 15 pages.

US Non-Final Office Action in U.S. Appl. No. 13/786,042, dated Mar. 12, 2015, 14 pages.

US Non-Final Office Action in U.S. Appl. No. 13/785,999, dated Mar. 25, 2015, 12 pages.

US Non-Final Office Action in U.S. Appl. No. 13/789,902, dated May 15, 2015, 15 pages.

US Non-Final Office Action in U.S. Appl. No. 12/400,690, dated Sep. 12, 2011, 7 pages.

US Final Office Action in U.S. Appl. No. 12/400,690, dated Jan. 11, 2012, 7 pages.

US Notice of Allowance in U.S. Appl. No. 12/400,690, dated May 9, 2012, 6 pages.

US Notice of Allowance in U.S. Appl. No. 13/786,042, dated Jul. 29, 2016, 7 pages.

US Non-Final Office Action in U.S. Appl. No. 15/171,695, dated Dec. 12, 2016, 17 pages.

* cited by examiner

POWER TRACE PORT FOR TRACING STATES OF POWER DOMAINS

TECHNICAL FIELD

This disclosure relates generally to hardware for generating power traces of systems with configurable power domains.

BACKGROUND

Some modern microcontroller systems are organized into power domains. A power manager of the microcontroller system can change a power configuration of a power domain based on the states of one or more modules (e.g., peripherals) in the power domain. Each module within a power domain may turn off independently of other modules in the power domain or other modules in other power domains. For example, a universal asynchronous receiver/transmitter (USART) can be kept awake while a transmit buffer is emptied and then automatically turned off when the task is complete. If the microcontroller system is capable of "sleep walking" the modules may be awoken to perform tasks before going back to sleep. In some systems, power domains may be hierarchical such that a power domain will be turned on if a higher level power domain is turned on even if the power domain has no active modules.

For all the foregoing reasons, debugging microcontroller systems with configurable power domains is difficult without tracing power domain states. Moreover, power domains cannot be instrumented using conventional on-chip debug systems because such debug systems typically require that all power domains in the microcontroller system be active at the same time.

SUMMARY

A power trace port included in a system (e.g., a microcontroller system) having multiple power domains includes a power trace port that outputs digital signals indicating the states of the power domains. If each power domain is independent of other power domains in the system, each power domain can have its own set of power trace pins in the power trace port that are at least partially external to the system. If a power domain has multiple states, multiple pins can be used to indicate the multiple states. In some implementations, the power trace port can include performance level pins for providing performance level signals. The power trace port can be coupled to power trace probes of a power analyzer that is external to the system for generating power traces.

In some implementations, an integrated circuit device comprises: one or more modules assigned to one or more of a plurality of power domains of the device; a power management unit coupled to the one or more modules and configured to change states of the plurality of power domains by turning the one or more modules on or off and to generate signals indicative of the changed states; and a power trace port coupled to the power manager unit and including one or more power trace outputs for each power domain for carrying the one or more signals, where the one or more power trace outputs are at least partially external to the device.

A method of generating power traces, comprises: assigning one or more modules of an integrated circuit device to one or more of a plurality of power domains of the device; changing power states of the plurality of power domains by turning the one or more modules on or off; generating one or more signals that indicate the changed power states; and applying the one or more signals to one or more power trace outputs of a power trace port of the device.

Other implementations are directed to methods, circuits and systems.

Particular implementations of the power trace port for tracing the states of power domains can provide one or more of the following advantages. The power trace port allows debugging of a system (e.g., a microcontroller system) that has multiple independent power domains. The integration of a power trace port into the system eliminates the need for expensive external power measurement equipment to measure power consumption.

DETAILED DESCRIPTION

Figure 1:
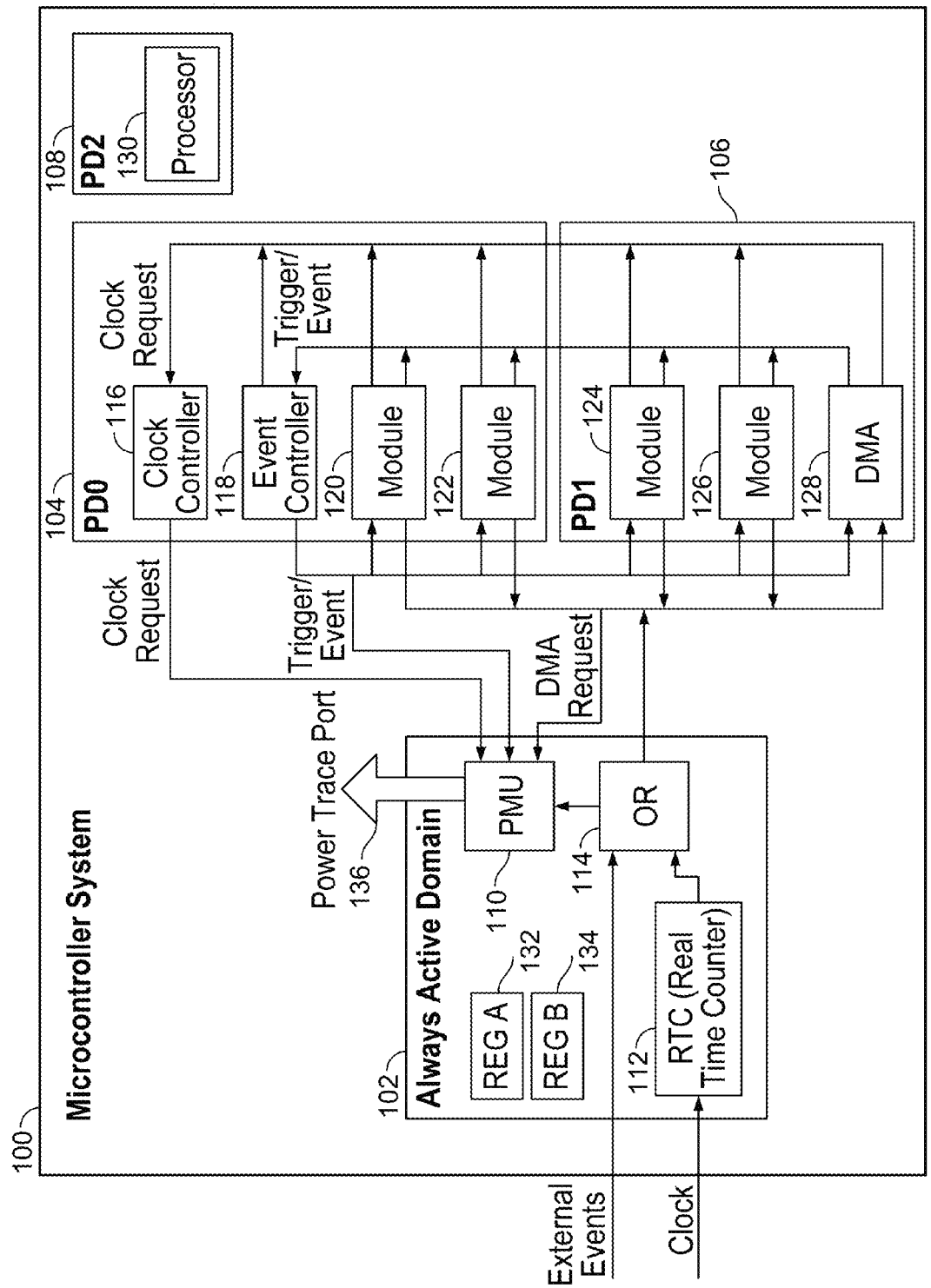
FIG. 1 is a block diagram of an example microcontroller system with a power trace port.

FIG. 1 is a block diagram of an example microcontroller system 100 with power trace port 136. In some implementations, microcontroller system 100 includes always active domain 102, power domain 104 (PD0), power domain 106 (PD1) and power domain 108 (PD2). Although system 100 is a microcontroller system, power trace port 136 can be used with any integrated circuit device or system that has multiple independently configurable power domains.

In some implementations, the always active domain 102 includes power manager unit 110, real time counter (RTC) 112 and OR gate 114. Always active domain 102 is always in an active mode. Always active domain 102 can include logic to reduce the impact on total power consumption due to always being in active mode.

Power manager unit 110 controls power configurations of power domains 104, 106, 108. A power domain can be, for example, one or more modules drawing power from a same power supply, e.g., at a same voltage. Microcontroller system 100 can maintain a power configuration for each power domain 104, 106, 108. A power configuration includes one or more parameters for a power domain specifying, e.g., a higher or lower voltage for the power domain, whether or not a clock is frozen for the power domain, whether certain modules are enabled or disabled or operating in a reduced state for a reduced voltage and so on. Changing the power configuration of a power domain can adjust the power consumption of a power domain. In some implementations, voltages for power domains 104, 106, 108 can be regulated by voltage regulators 132 (REG A) and 134 (REG B). For example, regulator 132 can be a high-voltage "Buck" voltage regulator and voltage regulator 134 can be a low-voltage switch-capacitor voltage regulator. In some implementations, switching between voltage regulators can be automatic based on a required performance that can be measured by monitoring input clock frequency of the power domains. When the input clock frequency exceeds a maximum level for a given voltage, the voltage regulator can increase the voltage or switch to a different voltage regulator.

Power domain 104 includes clock controller 116, event controller 118 and modules 120, 122 that can perform one or more tasks. For example, one of modules 120, 122 can be an analog-to-digital converter (ADC). Clock controller 116 can be configured to receive requests from modules 120, 122 for clock signals and provide requested clocks to requesting modules. To get a clock signal, a module requests the clock signal; otherwise the clock can be frozen to reduce power consumption. Event controller 118 routes triggers (events or requests) from a triggering module to an appropriate module depending on the trigger. Power domain 104 is an example of a power domain which is at the bottom of a power domain hierarchy, meaning all higher power domains depend on power domain 104. In practical terms, power domain 104 must be turned on before power domain 108 is turned on. Once power domain 108 is turned on the entire microcontroller system 100 is turned on.

Power domain 106 includes two modules 124, 126 that can perform one or more of various tasks and direct memory access (DMA) module 128. Power domain 108 includes processor 130, e.g., a central processing unit (CPU) for microcontroller system 100.

In operation, power manager unit 110 can change the power configuration of a power domain in response to event triggers from modules inside or outside of microcontroller system 100. For example, power manager unit 110 can cause a power domain to exit a power saving mode, such that one or more modules of the power domain can execute operations. Then the module can cease generating an event to revert the power domain to its previous power configuration or the module can generate a new event to change the power configuration of another domain. To perform power aware debugging of microcontroller system 100, power manager unit 110 can include power trace port 136. As described in reference to FIG. 2, power trace port 136 can provide digital signals that indicate the states of power domains 104, 106, 108.

Figure 2:
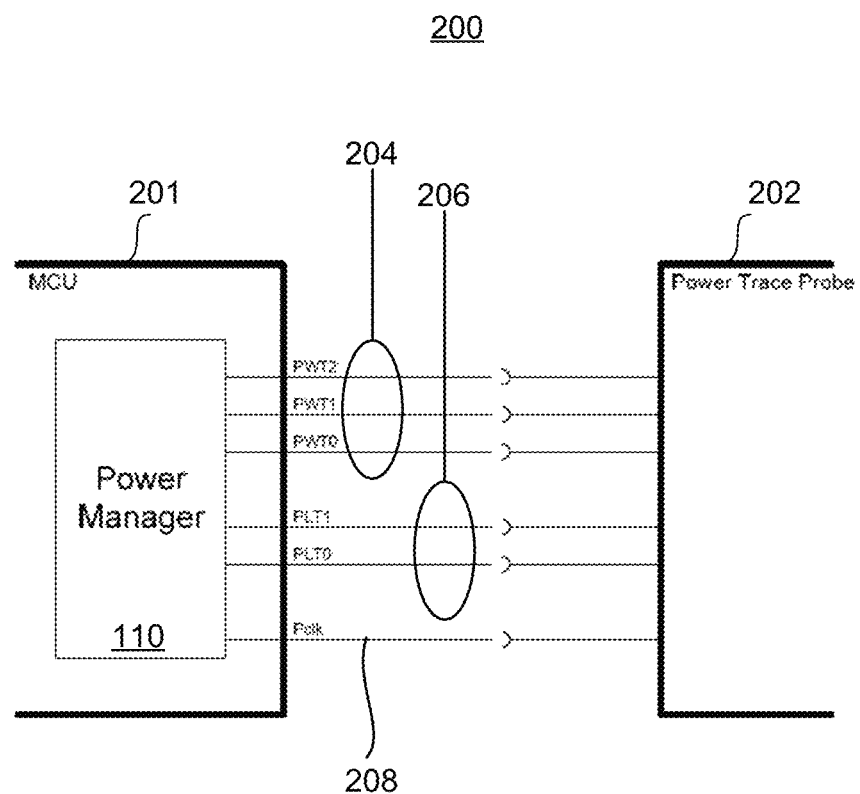
FIG. 2 illustrates an example power trace interface.

FIG. 2 illustrates an example power trace interface 200 coupling microcontroller system 100 with power trace probes 202. Power trace interface 200 includes power trace pins 204 coupled to power trace port 136 of power manager unit 110 and positioned at least partially external to package 201 of microcontroller system 100. In the example shown, power trace pins 204 include PWT2, PWT1 and PWT0 for power domains PD0, PD1 and PD2, respectively. Each power trace pin can provide an ON/OFF digital signal that indicates the state of the power domain. If a power domain has more than two power states additional power trace pins can be added to indicate the additional power states. For example, if there are 3 independent power domains in a given system where two of the power domains have 2 states (ON/OFF) and the third power domain has 5 states, the total number of possible states is 20 (2×2×5=20). Such an example system would include 20 power trace pins to represent the 20 possible states. In the example microcontroller system 100, we have a single system with hierarchical power domains, resulting in 5 possible states and 3 pins in power trace port 136. Performance level pins 206 (PLT1, PLT0) are used to trace performance levels of microcontroller system 100 while the microcontroller system 100 is active to indicate a performance level (e.g., to indicate a high-power or low-power mode). Clock pin 208 (PCLK) can be used by a power analyzer to synchronize power traces.

Power trace pins 204 can be coupled to logic in power manager unit 110. Each time a power domain is in active mode the logic level of the corresponding power trace pin is changed by, for example, raising the voltage of the corresponding power trace pin. For example, if power domains PD0, PD1 are active and PD2 is inactive, power trace pins 204 would output digital values PWT2=0, PWT1=1, PWT0=1. The digital values can be detected by power trace probe 202 and used to generate a power trace for microcontroller system 100. In some implementations, power trace probe 202 can be coupled to a power analyzer application running on a device (e.g., a computer) that monitors power consumption of microcontroller system 100 in real-time and provides real-time data and a trace graph.

Figure 3:
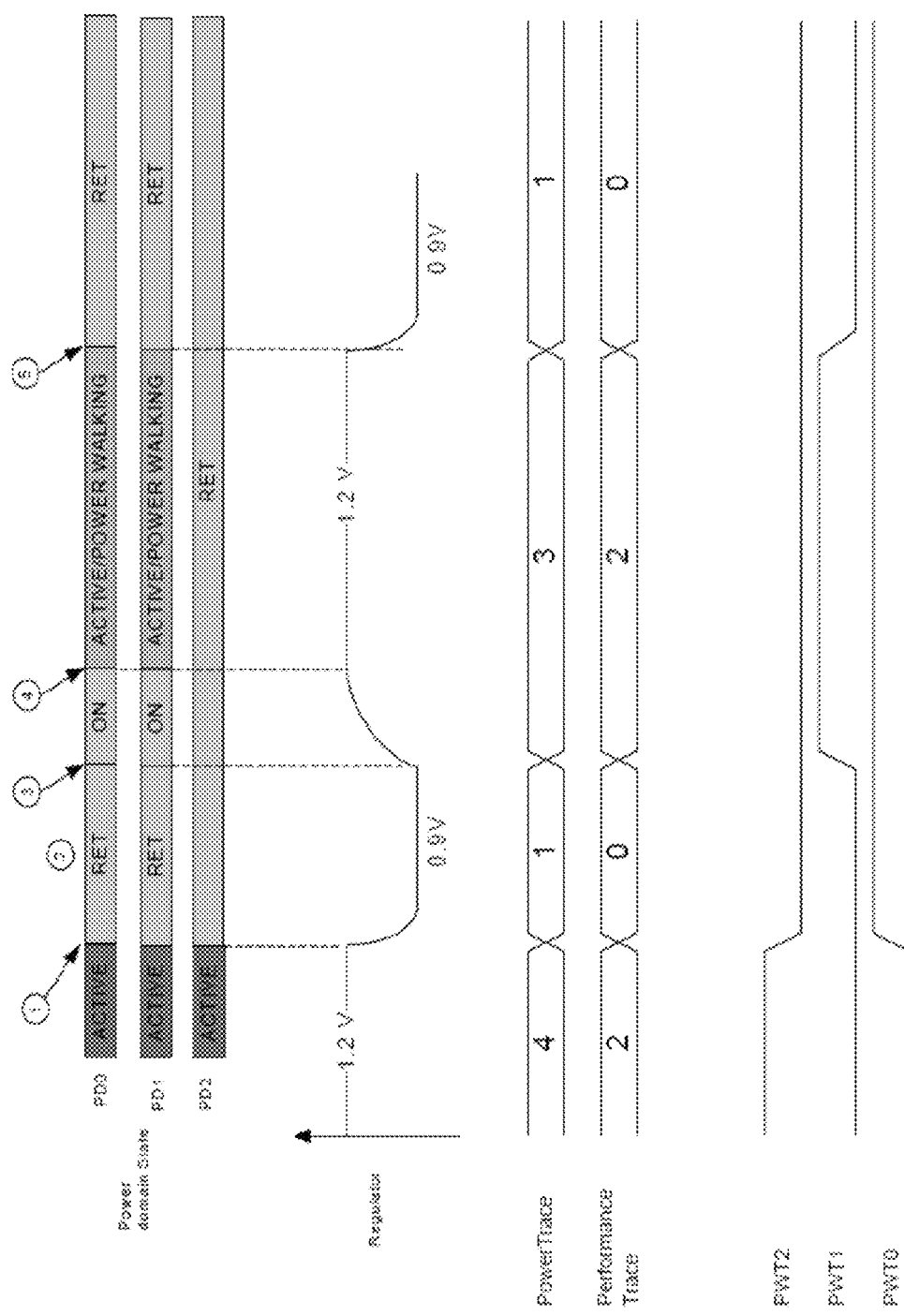
FIG. 3 is a timing diagram illustrating a hardware sequence used to perform a power-walking task in the microcontroller system of FIG. 1.

FIG. 3 is a timing diagram illustrating a hardware sequence used to perform a power-walking task in the microcontroller system of FIG. 1. The top of FIG. 3 shows the power domain states of power domains PD0, PD1 and PD2 during active or power walking Power walking (also referred to as "sleep walking") is described in co-pending U.S. patent application Ser. No. 14/043,445 for "Configuring Power Domains of A Microcontroller System," filed Oct. 1, 2013.

In the example shown, the states are ACTIVE, RETENTION (RET), ON and ACTIVE/POWER WALKING. In ACTIVE state, the power domain is fully powered to perform a task. In RET state, the power domain is maintained in a low power state to reduce power consumption. The ON state indicates a transition from RET state to ACTIVE state when the voltage regulators are changed from a low voltage switch-capacitor voltage regulator 134 (e.g., 0.9 volts) to a high voltage Buck voltage regulator 132 (e.g., 1.2 volts). In ACTIVE/POWER WALKING state the power domain is active and performing power walking, where power manager unit 110 can dynamically change one or more of power domains PD0, PD1, PD2, to a relevant power configuration depending on requests from power consumers (e.g., modules).

Below the power domain states is a regulated voltage graph, which illustrates a change in power configuration due to a change in regulated voltage. Below the regulated voltage graph our graphs illustrating power trace and performance states, which can be represented by the decimal equivalent of the binary signals on power trace pins PWT2, PWT1, PWT0. For this example configuration (3 power trace pins), the three power domains (PD0, PD1, PD2) shown in FIG. 1 are hierarchical, meaning PD2 relies on PD1 being turned on, which in turn relies on PD0 being turned on. The 3 power trace pins (PWT2, PWT1, PWT0) form a binary (decimal) number which indicates the highest domain that is ACTIVE: 000(0)—system completely active; 001(1)—always active on while PD0, PD1, PD2 off; 010 (2)—always active and PD0 on while PD1, PD2 off; 011 (3)—always active, PD1, PD0 on while PD2 off; and 100 (4)—all power domains turned on. Since there are two performance level pins PLT0, PLT1, there are four possible performance level states, which can be represented in binary (decimal) as: 00(0), 01(1), 10(2) and 11(3). Below the power trace and performance level signals are output signals for power trace pins PWT2, PWT1, PWT0.

Referring to FIGS. 2 and 3, an example hardware sequence is described for power walking by which a peripheral module can be selectively activated based on peripheral events, even in sleep modes where the module clock is stopped. There are five phases in the example hardware sequence. The five phases are indicated at the top of FIG. 3 to assist the reader.

In phase 1, microcontroller system 100 is in ACTIVE state and using Buck voltage regulator 132 (1.2 V). The power trace pin outputs during phase 1 are 101(4) and the performance level outputs are 10(2) or performance level 2 (PL2).

In phase 2, microcontroller system 100 is in Standby mode (RET state), Buck voltage regulator 132 is turned off and switch-capacitor voltage regulator 134 is turned on (e.g., 0.9 V) to reduce power consumption by microcontroller system 100. The power trace outputs in phase 2 are 001(1) and the performance level outputs are 00(0) or PL0.

In phase 3, a trigger condition occurs (e.g., an RTC event) to execute a task in power domains PD0 and PD1. This trigger condition is configured by microcontroller 100 in the ACTIVE state to not generate an interrupt. The trigger condition triggers an event to, for example, module 120 in power domain PD0. Switch-capacitor voltage regulator 134 is turned off and Buck voltage regulator 132 is turned on, causing power domains PD0, PD1 to be switched on and enter ACTIVE state based on the configuration of the event. The power trace outputs in phase 3 are 011(3) and the performance level outputs are 10(2) or PL2.

In phase 4, once PL2 is ready (voltage core has reached 1.2 V), the task is executed using power walking (clock request). The power trace outputs in phase 4 are 011(3) and the performance level outputs are 10(2) or PL2.

In phase 5 (the final phase in this example sequence), the power-walking task completes, microcontroller system 100 returns back to Standby (RET state) or a WAKE signal is sent to power manager unit 110 to return microcontroller 100 to ACTIVE state with PL2. The Buck voltage regulator turns off, the switch-capacitor voltage regulator turns on, the power trace outputs are 001(1) and the performance level outputs are 00(0).

Figure 4:
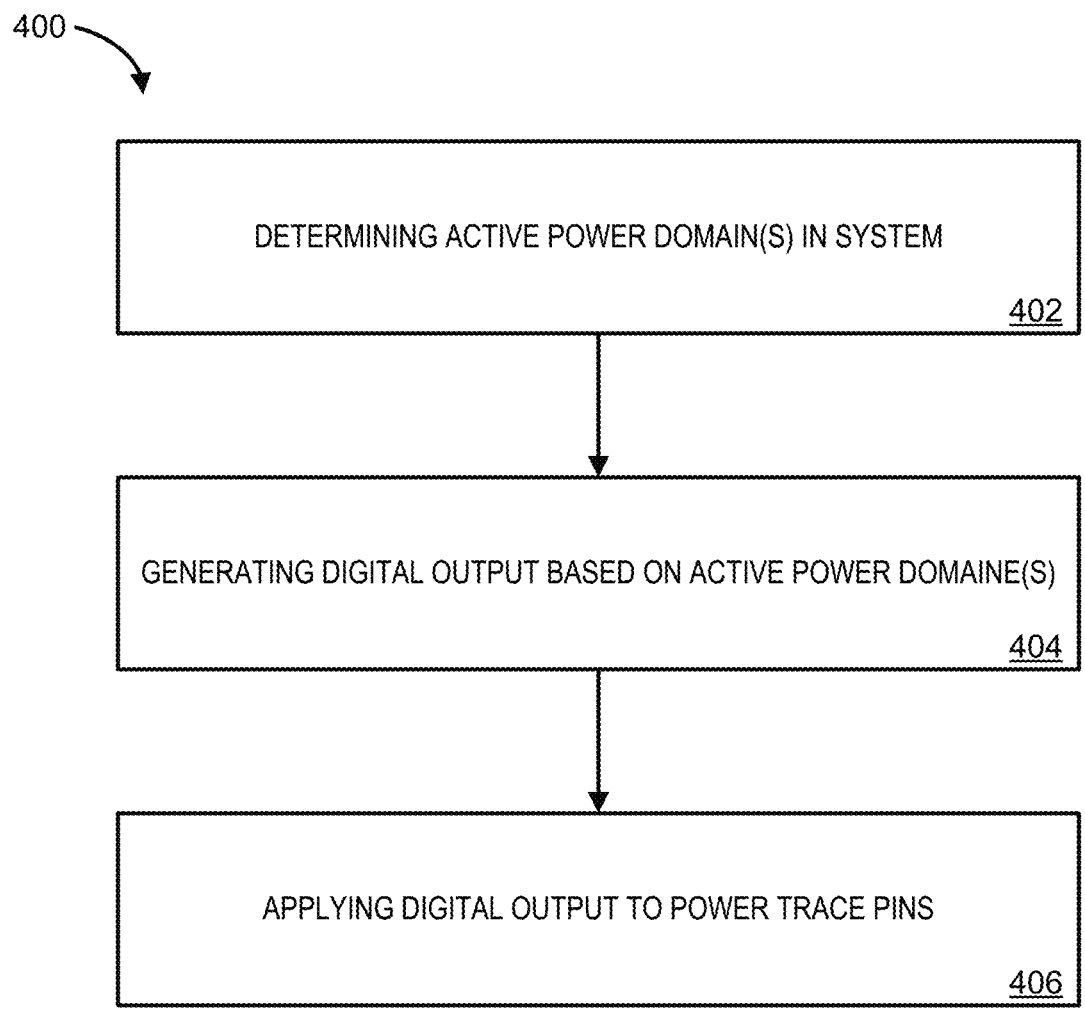
FIG. 4 is a flow diagram of a process for generating power trace signals.

FIG. 4 is a flow diagram of a process 400 for generating power trace signals. Process 400 can be performed by microcontroller system 100, as described in reference to FIGS. 1-3.

Process 400 can begin by determining states of power domain(s) in the system (402). For example, a power manager unit of a microcontroller system can configure power domains in the microcontroller system by switching voltage regulators supplying voltages to modules assigned to the power domains. Process 400 can continue by generating digital output signals representing the active states of the power domains (404). For example, logic in the power management unit can generate ON/OFF digital signals indicating the states of power domains. Process 400 can continue by applying the digital signals to power trace pins of the power manager unit (406). If a power domain can have more than two states, additional pins can be added to the power trace port for the power domain to indicate the additional states of the power domain. In some implementations, performance level pins can be added to the power manager unit to indicate performance levels of the system.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. An integrated circuit device comprising:
   a package;
   an integrated circuit included in the package and having modules assigned to power domains;
   a power management unit coupled to the modules and configured to change states of the power domains by regulating power to the modules and to generate signals indicative of the changed states;
   a power trace port coupled to the power management unit and including:
      one or more power trace outputs for the power domains for carrying the signals indicative of the changed states, the one or more power trace outputs positioned at least partially external to the package, and
      one or more performance level outputs for carrying one or more performance level signals indicative of one or more performance levels, where the one or more performance level outputs are at least partially external to the package;
   a first voltage regulator configured for regulating voltages of the modules of the power domains during a first mode of operation; and
   a second voltage regulator configured for regulating voltages of the modules of the power domains during a second mode of operation.

2. The device of claim 1, where the one or more performance levels are power levels.

3. The device of claim 1, where the device is a microcontroller system.

4. The device of claim 1, where the signals are digital signals.

5. The device of claim 1, where the power domains are hierarchical.

6. The device of claim 1, wherein at least one state is a power walking state.

7. The device of claim 1, wherein the first voltage regulator includes a high-voltage Buck voltage regulator, and
   wherein the second voltage regulator includes a low-voltage switch-capacitor voltage regulator.

8. A method of generating power traces, comprising:
   assigning modules of an integrated circuit device to power domains of the integrated circuit device;
   changing power states of the power domains by regulating power to the modules;
   generating signals that indicate the changed power states;
   applying the signals to one or more power trace outputs of a power trace port of the integrated circuit device;
   applying one or more performance level signals to one or more performance level outputs of the power trace port, wherein the one or more performance level signals are indicative of one or more performance levels of the integrated circuit device;
   regulating voltages of the modules of the power domains using a first voltage regulator during a first mode of operation of the integrated circuit device; and
   regulating voltages of the modules of the power domains using a second voltage regulator during a second mode of operation of the integrated circuit device.

9. The method of claim 8, where the one or more performance levels are power levels.

10. The method of claim 8, where the device is a microcontroller system.

11. The method of claim 8, where the signals are digital signals.

12. The method of claim 8, where the power domains are hierarchical.

13. The method of claim 8, where at least one state is a power walking state.

14. The method of claim 8, further comprising:
generating one or more power traces from the signals.

15. The method of claim 8, wherein the first voltage regulator includes a high-voltage Buck voltage regulator and the second voltage regulator includes a low-voltage switch-capacitor voltage regulator, and wherein regulating voltages of the modules of the power domains using the first voltage regulator or the second voltage regulator comprises:
monitoring voltage levels of the integrated circuit device;
regulating voltages of the modules of the power domains using the switch-capacitor voltage regulator during low voltage modes of operation; and
regulating voltages of the modules of the power domains using the Buck voltage regulator during high voltage modes of operation.

16. A device comprising:
a package;
an integrated circuit included in the package and having modules assigned to power domains;
a power management unit coupled to the modules and configured to change states of the power domains by regulating power to the modules and to generate signals indicative of the changed states;
a power trace port coupled to the power management unit and including one or more power trace outputs that are positioned at least partially external to the package, wherein the one or more power trace outputs are configured to provide the signals indicative of the changed states of the power domains to an external power trace probe to generate a power trace of the device; and
a first voltage regulator and a second voltage regulator that are configured to regulate voltages of the modules assigned to the power domains respectively during a first mode of operation and a second mode of operation.

17. The device of claim 16, where the power trace port further comprises:
one or more performance level outputs for carrying one or more performance level signals indicative of one or more performance levels, where the one or more performance level outputs are at least partially external to the package.

18. The device of claim 17, where the one or more performance levels represent power levels.

19. The device of claim 16, where the device includes a microcontroller system.

20. The device of claim 16, where the signals include digital signals.

21. The device of claim 16, where the power domains are hierarchical.

22. The device of claim 16, wherein at least one state is a power walking state.

23. The device of claim 16, wherein the first voltage regulator includes a high-voltage Buck voltage regulator, and
wherein the second voltage regulator includes a low-voltage switch-capacitor voltage regulator.

* * * * *

UNITED STATES PATENT AND TRADEMARK OFFICE
CERTIFICATE OF CORRECTION

| | |
|---|---|
| PATENT NO. | : 9,684,367 B2 |
| APPLICATION NO. | : 14/316625 |
| DATED | : June 20, 2017 |
| INVENTOR(S) | : Ingar Hanssen |

Page 1 of 1

It is certified that error appears in the above-identified patent and that said Letters Patent is hereby corrected as shown below:

In the Specification

Column 4, Line 16, replace "walking" with -- walking. --.

Signed and Sealed this
Third Day of October, 2017

Joseph Matal
*Performing the Functions and Duties of the*
*Under Secretary of Commerce for Intellectual Property and*
*Director of the United States Patent and Trademark Office*